United States Patent
Korhonen et al.

(10) Patent No.: US 9,226,132 B2
(45) Date of Patent: Dec. 29, 2015

(54) OPTIMISATION METHOD AND DEVICE IN COMMUNICATION NETWORKS

(75) Inventors: Jouni Korhonen, Riihimäki (FI); Tero Jalkanen, Tuusula (FI)

(73) Assignee: TeliaSonera AB, Stockholm (SE)

( * ) Notice: Subject to any disclaimer, the term of this patent is extended or adjusted under 35 U.S.C. 154(b) by 405 days.

(21) Appl. No.: 12/734,210

(22) PCT Filed: Oct. 28, 2008

(86) PCT No.: PCT/FI2008/050604
§ 371 (c)(1),
(2), (4) Date: Apr. 19, 2010

(87) PCT Pub. No.: WO2009/056675
PCT Pub. Date: May 7, 2009

(65) Prior Publication Data
US 2010/0235540 A1 Sep. 16, 2010

(30) Foreign Application Priority Data
Oct. 30, 2007 (FI) ...................................... 20075766

(51) Int. Cl.
*G06F 15/173* (2006.01)
*H04W 8/10* (2009.01)
(Continued)

(52) U.S. Cl.
CPC ................ *H04W 8/10* (2013.01); *H04W 80/04* (2013.01); *H04W 80/10* (2013.01)

(58) Field of Classification Search
CPC ....... H04W 8/10; H04M 15/00; H04Q 3/0025
USPC ............... 370/328, 231, 352; 455/445, 432.1, 455/435.1, 433; 709/204, 245
See application file for complete search history.

(56) References Cited

U.S. PATENT DOCUMENTS 5,878,348 A   3/1999  Foti
6,006,094 A * 12/1999  Lee ............................... 455/445
(Continued)

FOREIGN PATENT DOCUMENTS

EP   1 343 346 A1   9/2003
GB   2 379 135 A    2/2003
(Continued)

OTHER PUBLICATIONS

Cho, Yang-Cho, "Reducing the Network Cost of Call Delivery to GSM Roamers", IEEE Network, IEEE Service Center, New York, NY, US, vol. 11, No. 5, Sep. 1, 1997, pp. 19-25 XP000699937, ISSN: 0890-8044, DOI: DOI: 10.1109/65.620518.
(Continued)

*Primary Examiner* — Dustin Nguyen
(74) *Attorney, Agent, or Firm* — Cozen O'Connor

(57) ABSTRACT

The invention relates to a method for optimizing routing to a first user equipment (T1, T2) roaming in a visited network (OP B, OP C) in a communications system comprising at least a home network (OP A), a visited network (OP B, OP C) and a relaying network (IPX, IPX1, IPX2, IPX3, IPX4). The method of the invention comprises storing (2-4, 3-2, 3-4, 3-6) a location information of a first user equipment (T1, T2) to a database (DB) external to the home network (OP A) and the visited network (OP B, OP C), the location information being associated with an identification information of the first user equipment (T1, T2); receiving (2-6, 3-10) a message from a second user equipment (T1, T2); recognizing (3-12) at least one identification information of the first user equipment (T1, T2) in the message; comparing (3-14, 3-16) the identification information stored in the database (DB) with the identification information received in the message; and if the both identification information matches, routing (2-8, 3-26) a communication according to the location information of the first user equipment (T1, T2).

10 Claims, 2 Drawing Sheets

(51) Int. Cl.
*H04W 80/04* (2009.01)
*H04W 80/10* (2009.01)

(56) References Cited

U.S. PATENT DOCUMENTS

| | | | | |
|---|---|---|---|---|
| 6,662,017 | B2 * | 12/2003 | McCann | H04Q 3/0025 |
| | | | | 455/433 |
| 6,693,894 | B1 * | 2/2004 | Andersson et al. | 370/352 |
| 6,850,762 | B1 * | 2/2005 | Ala-Luukko et al. | 455/445 |
| 6,892,069 | B1 * | 5/2005 | Flynn | 455/432.1 |
| 7,272,392 | B2 * | 9/2007 | Boda | 455/432.1 |
| 7,313,631 | B1 * | 12/2007 | Sesmun et al. | 709/245 |
| 7,647,374 | B2 * | 1/2010 | Rajahalme et al. | 709/204 |
| 7,764,640 | B2 * | 7/2010 | Lee et al. | 370/328 |
| 2003/0114160 | A1 * | 6/2003 | Verkama | H04M 15/00 |
| | | | | 455/445 |
| 2004/0105420 | A1 | 6/2004 | Takeda et al. | |
| 2006/0039324 | A1 * | 2/2006 | Roy | 370/328 |
| 2006/0121904 | A1 * | 6/2006 | Reuhkala et al. | 455/445 |
| 2006/0276193 | A1 | 12/2006 | Itzkovitz et al. | |
| 2007/0121890 | A1 * | 5/2007 | Li et al. | 379/221.13 |
| 2008/0062871 | A1 * | 3/2008 | Grayson | 370/231 |
| 2009/0154396 | A1 * | 6/2009 | Akiyoshi et al. | 370/328 |
| 2012/0244861 | A1 * | 9/2012 | Agarwal et al. | 455/435.1 |

FOREIGN PATENT DOCUMENTS

| | | |
|---|---|---|
| GB | 2 429 373 A | 2/2007 |
| WO | WO 99/59371 | 11/1999 |
| WO | WO 01/47311 A1 | 6/2001 |
| WO | WO 01/60099 A1 | 8/2001 |
| WO | WO 03/019969 A1 | 3/2003 |
| WO | WO 2007/080213 A1 | 7/2007 |

OTHER PUBLICATIONS

Kato, T. et al: "A study on mobile IPv6 based mobility management architecture", Fujitsu-Scientific and Technical Journal, vol. 37, No. 1, Jun. 1, 2001, pp. 65-71, XP002483264, ISSN: 0016-2523.

* cited by examiner

OPTIMISATION METHOD AND DEVICE IN COMMUNICATION NETWORKS

PRIORITY CLAIM

This is the U.S. national stage of application No. PCT/FI2008/050604, filed on 28 Oct. 2008. Priority is claimed from Finland Patent Application No. 20075766, filed 30 Oct. 2007, the entire content of which is expressly incorporated herein by reference.

FIELD OF THE INVENTION

The present invention relates to optimisation of communications networks, and more particularly to a method and device for optimising routing in an inter-operator communications networks.

BACKGROUND OF THE INVENTION

In a typical roaming situation a user always registers to his home network e.g. in Finland. If clients of other operators want to contact the user, the traffic transfers via the home network. Thus in an unwanted situation where the user is visiting in a visited network e.g. in Australia, the traffic transfers from Australia to Finland and back to Australia instead of a situation where the traffic stays in Australia. Especially incoming real time services like a VoIP (Voice over Internet Protocol) service suffers dramatically from this problem.

BRIEF DISCLOSURE OF THE INVENTION

An object of the present invention is thus to provide a method and an apparatus for implementing the method so as to overcome the above problem. The objects of the invention are achieved by a method and an arrangement, which are characterized by what is stated in the independent claims. The preferred embodiments of the invention are disclosed in the dependent claims.

The invention is based on the idea of comparing at least one location information and identification information of a user equipment to corresponding information in a database in response to a triggering event and based on the comparison providing information for routing the traffic within a visited network.

An advantage of the method and arrangement of the invention is that delays in inter-operator communications can be reduced.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
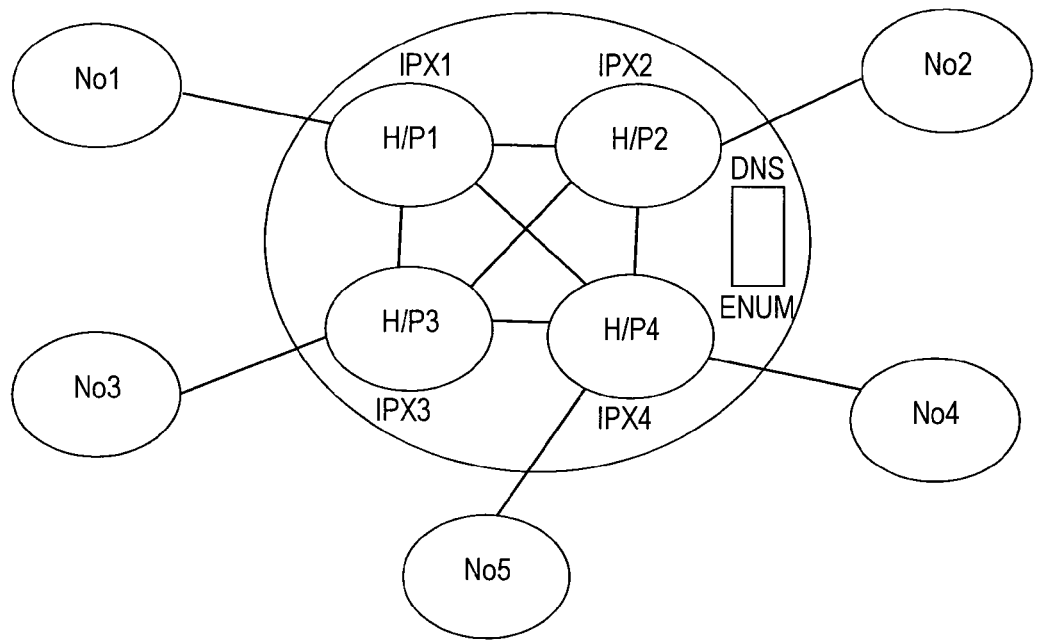
FIG. 1 is a block diagram of a GRX/IPX system according to the invention and its embodiments.

FIG. 1 is a block diagram of a GRX/IPX (GPRS, General Packet Radio Service, roaming exchange/Internet Packet Exchange) system describing a high level architecture of IPX. A first network operator NO1, like a 3GSM ($3^{rd}$ generation Global System for Mobile Communication) mobile operator, is connected to or in communication with a first Internet packet exchange IPX1 having a first hub/proxy H/P1. A second network operator NO2, like a fixed and mobile operator, is connected to or in communication with a second Internet packet exchange IPX2 having a second hub/proxy H/P2. A third network operator NO3, like another mobile operator e.g. CDMA2000 (Code Division multiple Access) mobile operator, is connected to or in communication with a third Internet packet exchange IPX3 having a third hub/proxy H/P3. A fourth network operator NO4, like another service provider, is connected to or in communication with a fourth Internet packet exchange IPX4 having a fourth hub/proxy H/P4. A fifth network operator NO5, like a fixed operator e.g. NGN (Next Generation Network) operator, is also connected to a fourth Internet packet exchange IPX4. The IPX network can also comprise other elements, systems or subsystems like a DNS/ENUM (Domain Name System/Enumeration) component. The Internet packet exchanges can be connected to or be in communication with each other. Between network operators and Internet packet exchanges there can exist a firewall system e.g. for enforcing access control. The number of network operators, Internet packet exchanges, connection, network elements etc. and their features and their locations in relation with each other can vary. Also some of the functions of said elements and system can be divided into two or more parts and can be located in a different way as disclosed in FIG. 1.

Figure 2:
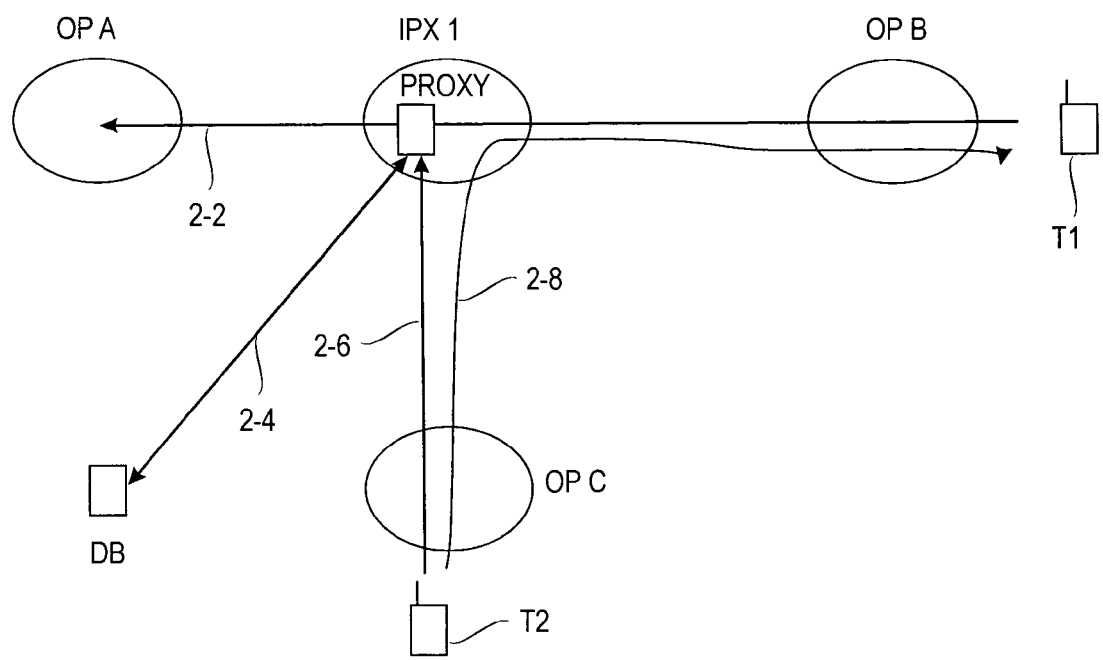
FIG. 2 is a flow diagram according to the invention and its embodiments.

FIG. 2 is a flow diagram according to the invention and its embodiments. It discloses three operators OP A, OP B and OP C and the Internet packet exchange IPX 1 having a proxy. The proxy can communicate 2-4 with one or more databases DB. FIG. 2 also shows two terminals T1 and T2.

Figure 3:
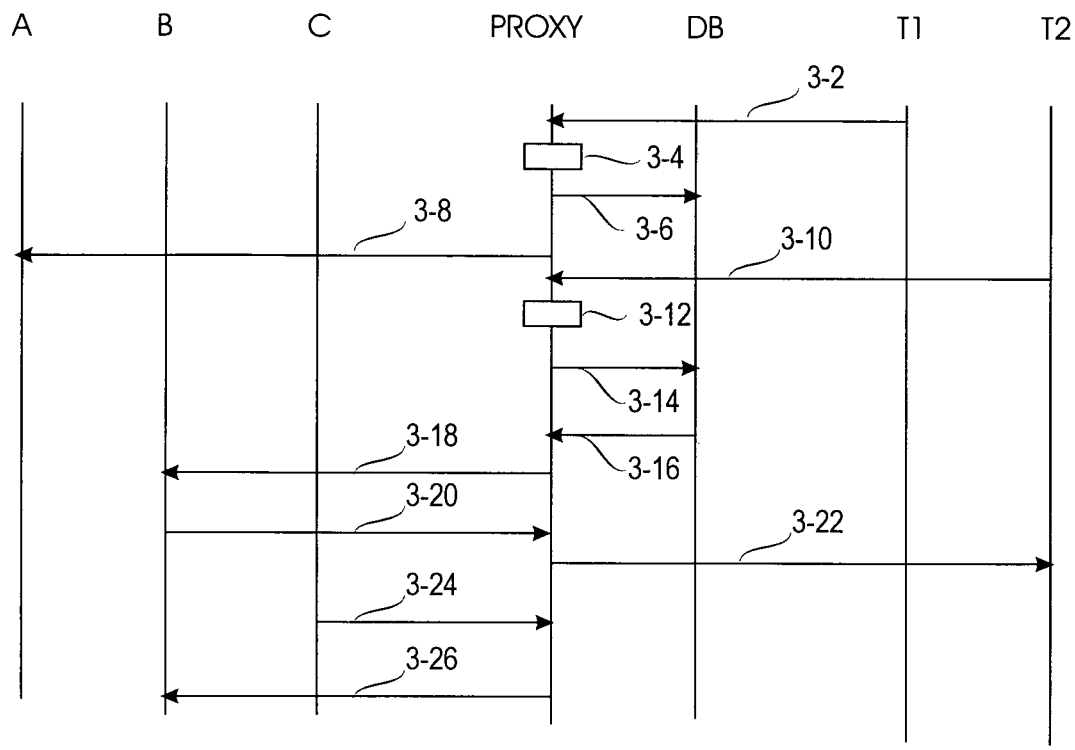
FIG. 3 is a signalling diagram according to the invention and its embodiments.

In step 2-2 the terminal 1 T1, which is roaming in a visited network OP B, registers to its home network OP A. The registering transfers through the IPX network IPX 1. The proxy existing e.g. in the IPX network, in a corresponding network and/or in a network between the operators realizes in the registering message that the location of T1 is the network OP B instead of the conventional network OP A, and stores in step 2-4 this information to a register or to a database, which can be its own register or database. In step 2-6 a second terminal T2 in the network OP C wants to call the terminal 1 e.g. to a video call, and sends a message, like SIP INVITATE (Session Initiate Protocol) message to T1. The network OP C realises that T1 is not its own client and forwards the message, like said SIP INVITATE message further to the IPX network. The proxy recognises at least one identification information of the user equipment in response to receiving the message comprising the identification information. In step 2-8 a proxy in the IPX network receives the INVITE message and starts to determine the location of T1. The proxy can also check whether the location information corresponding to the user equipment is found at least partly based on the identification information. Finally, if the comparison matches, the call or the communication can be routed according to the location information. In other words, in identifying the user and/or the terminal, data or information in one or more databases, e.g. in the database of the proxy is compared with the received data or information and if it matches with the incoming data or information like INVITE data, a signal can be given to the optimisation process and it can be started and completed. This means that the recipient is such that it can be found from the database of the proxy e.g. at least partly in response to a unique user ID (Identification) like a phone number, public SIP URI (Session Initiation Protocol Uniform Resource Identifier), or another ID, which can differentiate the user X from the user Y or the terminal A from the terminal B. FIG. 3 is a signalling diagram according to the invention and its embodiments. As in the case with FIG. 2, in step 3-2 the terminal T1, which is roaming in a visited network OP B, registers to its home network OP A. The registering transfers through the IPX network IPX 1. The proxy existing e.g. in the home network realizes in the registering message that the location of T1 is the network OP B instead of the conventional network OP A, and stores in step 3-6 this information to its own register, memory, data medium or to the database. This information is also communicated to the home network A in step 3-8. In step 3-10 the second terminal T2 in the network OP C wants to call the terminal T1 to a video call, and sends a SIP INVITATE (Session Initiate Protocol) message to T1. The network OP C realises that T1 is not its own client and forwards said SIP INVITE message further to the IPX network. In step 3-12 the proxy in the IPX network receives the INVITE message and starts to determine in step 3-14 the location of T1 at least partly based on the information communicated to the database. In response to the step 3-16 from the database the IPX proxy realises that the location of T1 is currently under the network OP B on the basis of a previous registering message between T1 and OP B or of a corresponding message. In one embodiment e.g. the terminal or the visited network can send a separate location update message, at least partly on the basis of which the proxy knows the new visited network of T1. Also other processes can be used for the proxy to know the location of T1. After this it sends in step 3-18 the INVITE message further to the network OP B and not to the network OP A, as conventionally, from which it would circulate back to T1 through the IPX network. In the next step 3-20 T1 receives the message INVITE via OP B and responses to it as accepted or rejected or not interested. After the acceptance message the response is routed via the same route back to the terminal T2 in step 3-22. The terminal T2 can start to deliver video data. T2 can start to send video stream as soon as it has received a positive answer from the terminal T1 (like OK message to the SIP INVITE message). An RTP (Real Time Transfer Protocol) stream starts to the network OP C IN STEP 3-24, which routes it to the proxy of IPX network. The proxy can check the location of T1 from its own database and routes it to the OP B network IN STEP 3-26.

The invention can be described to comprise a method and a device for optimising routing to a first user equipment T1, T2 roaming in a visited network OP B, OP C in a communications system comprising at least a home network OP A, a visited network OP B, OP C and a relaying network IPX, IPX1, IPX2, IPX3, IPX4. The invention comprises storing 2-4, 3-2, 3-4, 3-6 a location information of a first user equipment T1, T2 to a database DB external to the home network OP A and the visited network OP B, OP C, the location information being associated with an identification information of the first user equipment T1, T2; receiving 2-6, 3-10 a message from a second user equipment T1, T2 and/or from a network element; recognizing 3-12 at least one identification information of the first user equipment T1, T2 in the message; comparing 3-14, 3-16 the identification information stored in the database DB with the identification information received in the message; and if the both identification information matches, routing 2-8, 3-26 a communication according to the location information of the first user equipment T1, T2.

The location information can comprise location information and/or presence information of the user equipment. The checking can be made at least partly based on the sender's or recipient's information or the information of one or more user equipment. Providing routing information for and/or routing a communication can be according to the stored location information or according to the location information received e.g. after the comparing, and being associated with an identification information of the first user equipment (T1, T2)

Instead of the comparing, the stored identification information can be searched from the database in response of receiving the identification information in the message. If the in the message received identification information can be found from the database, the communication information can be routed according to the location information being associated with the stored identification information of the first user equipment (T1, T2).

When the device, e.g. the proxy receives the message, e.g. INVITE, it can check at least partly based on the message whether it has some information, like roaming information on the recipient of the call. If it has said information or enough information on the recipient it does not send the call or communication to the home network of the recipient but to the visited network. It can also check based on the received INVITE answer whether it has roaming information on the sender's (T1) answer and if it has does not send the message to the home network but directly to the home network of the recipient (T2) of the answer.

The data or information on the location of the user equipment and/or the identification of the user equipment can be received by one or more messages or signallings or by other means.

Figure 4:
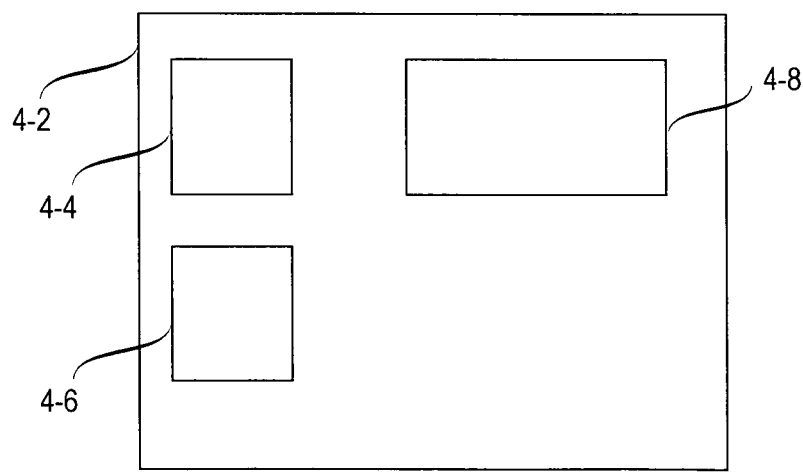
FIG. 4 is a diagram of a proxy according to the invention and its embodiments.

The data transfer can be implemented and done with different kind of services and protocols used by the service. The above-mentioned protocol RTP is only one example of the possible protocols to be used in communicating with one or more services, like video streaming. Many other protocols, like MSRP (Message Session Relay Protocol) or SMTP (Simple Mail Transfer Protocol) etc. can also be used. FIG. 4 is a diagram of a proxy according to the invention and its embodiments. The proxy can be adapted to function according to the IPX network. The IPX proxy 4-2 can be a SIP proxy with additional functionality and it can be located in the IPX network for supporting any kind of SIP traffic, e.g. various IMS (Internet Protocol Multimedia Subsystem) based services. The proxy can be transparent for IMS terminal, service and core system and it does not require any modifications to IMS implementations or 3GPP specifications although it can be modified. The proxy can be used to route a user plane, e.g. RTP, and/or a control plane, e.g. SIP.

The functions and elements 4-4 and 4-6 of the IPX proxy can comprise admission control logic, route logic CDR (Call Detailed Record) creation, signalling procession part and media processing part. It has also components, elements and/or programs 4-8 for communicating with one or more databases like roaming databases and logic relating to its handling. Otherwise a known proxy can be used e.g. for functions relating to billing.

The invention and its embodiments enables a global register, like a global VLR (Visitor Location Register) register, whose data and information can be used and utilized when the traffic is to be optimised for some reason such that it does not or not always have to transfer via the home network.

The invention and its embodiments suppose that the proxy has a state. This means that the proxy has to be able to have, to maintain or to access to state data or information of the movement of one or more terminals. Based at least partly on this data or information it can route traffic to a correct location and to the correct visited operator. This means that it knows or can have information that the current location of T1 is OP2, but if T1 changes its location also the proxy must update its information to the database or reach to the updated information. Another supposition is that a group of inner proxies of one IPX shares the same state information. Thus, if the network IPX1 hosts e.g. ten SIP proxies, all of them know according to the above example that the terminal 1 is registered from the network of the operator B. This is successful, if the database is e.g. a shared resource between all proxies.

As regards to the billing according to the invention and its embodiments, there exist many ways for handling it. The proxy can be adapted for billing processes, because it is responsible for the routing of the traffic. The proxy can collect data of the traffic that transfers therethrough and can send a bill based on the traffic to the sending end or to the receiving operator. In other words, the proxy can act as a billing aggregator. The proxy can know e.g. the sending operator, the receiving operator, the user, the used service, the amount of transferred data and other information. The operator can trust this bill, and it can have its own assuring billing system, by which the bill generated by the proxy can be compared to the bill generated by the assuring billing system.

The billing procedure between the operators can be very a complicated matter, which can be processed in various ways. The billing can be "out-sourced" to the IPX element or the operators can take care of it by themselves. There can also be some agreements or agreement models between the operators. Also traditional models for the billing can be used relating e.g. to general models and also to specific issues like how to transfer a ticket for the proxy to the home operator.

The proxy can also route the traffic based on the bill, i.e. the operator can be ready to pay a higher price, if it can receive the optimisation of the traffic compared to the situation where it can save money but obtains worse quality from the IPX network.

The invention and its embodiments are described in relation to IP-based (Internet Protocol) connections between operators and between service providers. Especially IP backbone network IPX of the operators is described, which can be a network closed for others, but the invention and its embodiments are not restricted to IPX networks. The inventions and its embodiments make different kind of optimisation possible between the traffic of operators, which optimisation can relate e.g. to how to avoid circulation of traffic always or usually through a home operator in a roaming situation.

In a roaming situation a first user typically registers to his home network. If a user of other operators wants to contact the first user, the traffic must be transferred through the home network. Thus an unwanted situation of transferring the traffic from one country to another country can be avoided, communications delays minimised and system resources saved. So far this problem has not been arisen, partly because of real time IP services have not existed, or partly because of a usage of a service which has no compulsory registering through the home network or circulation of traffic through the home network.

The large-scale usage of real time IP based services is now possible. Also the optimisation of signalling of both inbound and outbound roaming calls and services are now possible. As a multiplicative effect the media can also be optimised.

The present disadvantage that IP based audio data or video data have less quality than CS (Circuit Switched) based audio data or video data can be eliminated. The longer routing of IP data does not now effect e.g. on the quality of data or the optimisation of data.

The solutions known so far for optimising the route for the media do not work for the signalling. Moreover the solutions stop the usage like IMS based VoIP service. Also other services like SIP based VoIP, real time traffic like IP based video call service can suffer from the known solutions or the implementations of these known solutions. These can be avoided according to the invention and its embodiments. In addition, no separate support is needed, and no agreement between different operators is needed on either side of the operators, although the support can be provided and agreement(s) can be made. The solutions can also be connected with circuit switched calls and call establishment.

Furthermore, the invention and its embodiments are not restricted to a certain type of traffic, service or protocol, but can be used for IMS based services, other SIP services or other types of services or any IP based service e.g. relating but not restricted to IMS or SIP, like when the traffic transfers via or through the IPX network and the proxy locating therein such that the proxy knows where the other end is located. Then the IPX can make the optimisation as transparent to the protocols.

The invention and its embodiments do not need anything special of the operators or of their service platforms like IMS, MMSC (Multimedia Messaging Service Center), VoIP server, MSC (Mobile Services Switching centre), MGW (Multimedia Gateway), Instant Messaging server, or PoC (Push to Talk over Cellular) server.

Thus e.g. the IMS does not have to know what happens between the operators, but it can act and function as previously before the start of the optimisation. The optimisation can bring special advantage to the IPX networks and the operators thereof. This is because it on the other hand promotes the good quality of IPX by making it even better and because on the other hand the traffic between different IPN networks and/or IPX carriers can be minimised through the optimisation of the traffic. This saves resources and money, because e.g. less IPX peer points are needed. Also the signalling load of the core network(s) of the operator(s) can be minimised, because major portion of the roaming signalling does not have to circulate or transfer via the home network.

The proxies in the network can have some kind of intelligence or databases, because they are state conscious, i.e. know the location of different terminals.

It is also possible that the proxies cooperate with each other on a small scale or on a large scale or even as a whole scale of the IPX network. The invention and its embodiments can also work within one IPX, e.g. as an additional value service.

The traffic e.g. of some services can be routed via the home network, if e.g. policy control, QoS control or billing operations capabilities of the home network are wanted to be used. This does not relate to all types of traffic or services. In some cases the operators wants to see and/or check the traffic by itself. In these situations the invention and its embodiments work partly or not at all. Generally, there exists a confidence between the operator and the IPX network also when the optimisation is used.

The implementation of the invention may be difficult if the signalling traffic is secured or if the IPX does not have a change to decrypt or decode the used signalling and/or encryption, although in the secured IPX environment there is no reason to keep the signalling secret. If the proxy can do the decrypting of the decoding then the proxy does not face any problems.

There exist many different ways to vary the invention and its embodiments. E.g. the registering of the terminal to the proxy database in the visited network can be processed in many different ways. They comprise the registering message send to the home network, which is send from the terminal even if the optimisation procedure is not in use. The information can also be inputted to the database(s) in the proxy by the home operator in many ways, e.g. by utilizing the information of the circuit switched side, like the HLR/VLR (Home Location Register/Visiting Location Register) information, by which information it is known where the terminal is locating. This can be through a database interface at least partly depending on the implementation of the database.

It is possible to route IP traffic to the terminal as an optimised way even if the terminal is not even registered to the home network to utilize an IP service like IMS.

Although the invention and its embodiments are related to the IPX network they are not restricted only to the IPX network. Also in other kind of networks the optimisation can be utilized. One example is e.g. any IP based network, which is utilized in the roaming situation and which can offer a proxy type functionality. In addition to the operators, also e.g. ISPs (Internet Service Providers), fixed network operators and companies can utilize the optimisation.

It will be obvious to a person skilled in the art that, as the technology advances, the inventive concept can be implemented in various ways. The invention and its embodiments are not limited to the examples described above but may vary within the scope of the claims.

The invention claimed is:

1. A method for optimizing signalling and routing to a first user equipment roaming in a visited network in a packet data communications system comprising at least a home network, the visited network and a relaying network arranged between operators, the relaying network being in common use with multiple operators, the method comprising:
providing a routing address to the home network via identification information of the first user equipment;
storing location information of the first user equipment to a database external to the home network and to the visited network, the location information being associated with the identification information of the first user equipment and including information relating only to the location information of the user equipment;
receiving a message from a second user equipment;
recognizing the identification information of the first user equipment in the received message;
comparing stored identification information stored in the database with the recognized identification information received in the message; and
in an event said comparing determines a match of the stored identification information and the recognized identification information, routing the communication according to the stored location information of the first user equipment directly from the relaying network to the visited network instead of using the routing address obtained by the identification information of the first user equipment.

2. The optimization method as claimed in claim 1, wherein the location information is stored at least one of during a setup phase and during a registering phase of the first user equipment.

3. The optimization method as claimed in claim 1, wherein the message is one of a session control message and an INVITE message.

4. The optimization method as claimed in claim 2, wherein the message is one of a session control message and an INVITE message.

5. The optimization method as claimed in claim 1, further comprising checking the stored location information when the relaying network receives the message transferring one of from the first user equipment to the second user equipment and from the second user equipment to the first user equipment.

6. The optimization method as claimed in claim 2, further comprising checking the stored location information when the relaying network receives the message transferring one of from the first user equipment to the second user equipment and from the second user equipment to the first user equipment.

7. The optimization method as claimed in claim 3, further comprising checking the stored location information when the relaying network receives the message transferring one of from the first user equipment to the second user equipment and from the second user equipment to the first user equipment.

8. A computer program product for relaying of communications and comprising a non-transitory computer-readable medium bearing computer program code embodied therein for use with a computer, the computer program code, when executed by at least one processor, causing operations comprising:
providing a routing address to a home network from which a communication is received via identification information of a first user equipment of the home network;
storing location information of the first user equipment to a database external to the home network and to a visited network to which the communication is directed, the location information being associated with the identification information of the first user equipment and including information relating only to the location information of the user equipment;
wherein the device is not a part of the home network and the visiting network;
receiving a message from a second user equipment of the visited network;
recognizing the identification information of the first user equipment in the received message;
comparing stored identification information stored in the database with the recognized identification information received in the message; and
in an event said comparing determines a match of the stored identification information and the recognized identification information, routing the communication according to the stored location information of the first user equipment directly to the visited network instead of using the routing address obtained by the identification information of the first user equipment.

9. A device for relaying of communications, comprising:
at least one processor; and
at least one memory including computer program code, the at least one memory and the computer program code being configured to, with the at least one processor, cause the device to:
provide a routing address to a home network from which a communication is received via identification information of a first user equipment of the home network;
store location information of the first user equipment to a database external to the home network and to a visited network to which the communication is directed, the location information being associated with the identification information of the first user equipment and including information relating only to the location information of the user equipment;
wherein the device is not a part of the home network and the visited network;
receive a message from a second user equipment of the visited network;
recognize the identification information of the first user equipment in the received message;

compare stored identification information stored in the database with the recognized identification information received in the message; and in an event said comparing determines a match of the stored identification information and the recognized identification information, route the communication according to the stored location information of the first user equipment directly to the visited network instead of using the routing address obtained by the identification information of the first user equipment.

10. The device according to claim 9, wherein the device is a proxy.

* * * * *